United States Patent [19]

Brandstetter

[11] E Patent Number: Re. 33,254

[45] Reissued Date of Patent: Jul. 10, 1990

[54] BRIDGE TYPE COORDINATE MEASURING MACHINE

[76] Inventor: Robert W. Brandstetter, 418 Cherrywood Dr., Fairborn, Ohio 45324

[21] Appl. No.: 208,315

[22] Filed: Jun. 17, 1988

Related U.S. Patent Documents

Reissue of:

[64] Patent No.: 4,594,791
Issued: Jun. 17, 1986
Appl. No.: 694,378
Filed: Jan. 24, 1985

[51] Int. Cl.[5] ..... G01B 5/03; G01B 7/03

[52] U.S. Cl. ..... 33/503; 33/1 M

[58] Field of Search ..... 33/1 M, 503, 568; 384/12

[56] References Cited

U.S. PATENT DOCUMENTS

| | | | |
|---|---|---|---|
| 2,620,256 | 12/1952 | Kerns et al. | 346/32 |
| 3,241,243 | 3/1966 | Speer | 33/174 |
| 3,639,993 | 2/1972 | Sartorio | 33/503 |
| 3,749,501 | 7/1973 | Wieg | 356/169 |
| 3,774,311 | 11/1973 | Stemple | 33/503 |
| 3,840,993 | 10/1974 | Shelton | 33/1 M |
| 4,138,822 | 2/1979 | Parody | 33/169 R |
| 4,155,173 | 5/1979 | Sprandel | 33/174 |
| 4,175,327 | 11/1979 | Herzog | 33/1 M |
| 4,229,866 | 10/1980 | Berthier | 29/26 A |
| 4,315,371 | 2/1982 | Kontani et al. | 33/1 M |
| 4,442,607 | 4/1984 | Sakata et al. | 33/503 |
| 4,455,910 | 6/1984 | Kraft et al. | 384/12 |
| 4,727,653 | 3/1988 | Fujitani et al. | 33/1 M |

FOREIGN PATENT DOCUMENTS

| | | | |
|---|---|---|---|
| 2546544 | 5/1976 | Fed. Rep. of Germany | 33/1 M |
| 55-69008 | 5/1980 | Japan | 33/546 |
| 518161 | 7/1972 | U.S.S.R. | 33/1 M |
| 621955 | 8/1978 | U.S.S.R. | 33/1 M |

*Primary Examiner*—William A. Cuchlinski, Jr.
*Assistant Examiner*—Diego F. F. Gutierrez

[57] ABSTRACT

A bridge type coordinate measuring machine characterized by a bridge (20) that has a closed loop configuration encircling the measuring machine base (10). The bridge (20) includes two uprights (21, 22), an upper member (23) connecting the uprights together and at least one lower member (24) connecting the uprights together below the upper surface (11) of the base (10). Bearings (41) for the bridge are offset inwardly from the vertical axes of the uprights of the bridge and a guideway (12, 13), along which the bearings travel, is located on each side of the base. The bearings (41) operate upwardly, downwardly and sidewardly against the surfaces of the guideways (12, 13) located on the sides of the base (10). This arrangement both stiffens and raises the resonant frequency of the bridge, thereby improving the measuring accuracy and repeatability of the coordinate measuring machines performance.

89 Claims, 2 Drawing Sheets

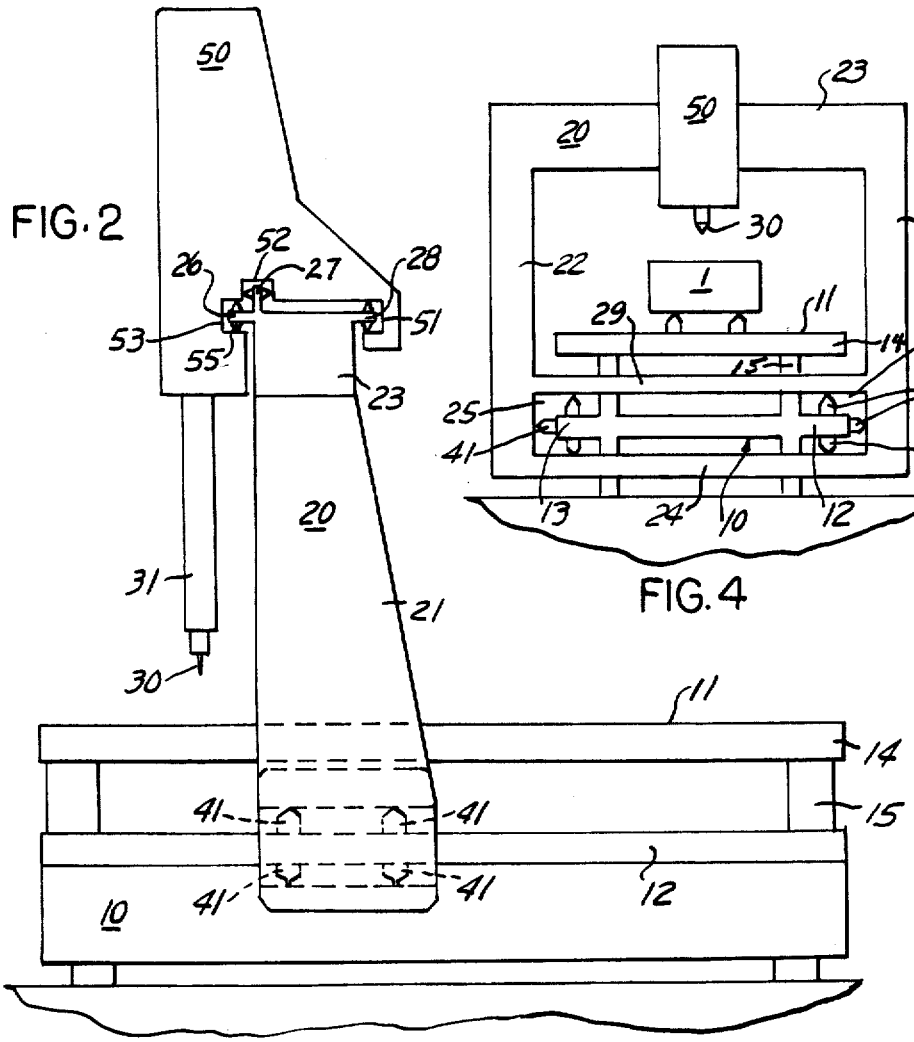
FIG. 2
FIG. 4
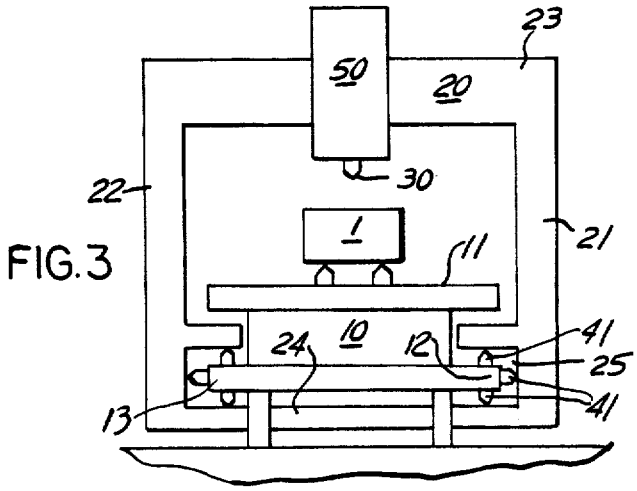
FIG. 3

BRIDGE TYPE COORDINATE MEASURING MACHINE

Matter enclosed in heavy brackets [ ] appears in the original patent but forms no part of this reissue specification; matter printed in italics indicates the additions made by reissue.

This invention relates to a bridge type coordinate measuring machine (CMM) for measuring the dimensions of a workpiece.

A bridge type coordinate measuring machine is generally comprised of a base, a bridge [moveably] *movably* mounted to the base, a carriage [moveably] *movably* mounted to the upper portion of the bridge, a probe [moveably] *movably* mounted to the carriage and a measuring and computation system that responds to movement of the probe for measuring the dimensions of a workpiece located on the upper surface of the base. Examples of bridge type coordinate measuring machines may be found in U.S. Pat. Nos. 3,749,501 entitled "Measuring Machine" issued July 31, 1973; and 3,840,993 entitled "Coordinate Measuring Machine" issued Oct. 15, 1974. The important functions of a coordinate measuring machine are its accurate measurement and its repeatability i.e. ability to repeat or obtain the same measurement from the same workpiece. In a bridge type coordinate measuring machine accuracy and repeatability may be adversely affected by vibration and relative movement between the uprights of the bridge. Poor stiffness or ridigity of the bridge permits relative movement between the uprights of the bridge while height, spacing and stiffness all affect resonant frequency, which if low, makes the measuring probe mounted on the bridge more susceptible to vibrations.

One approach to minimizing or dampening the effect of vibrations on a CMM has been to mount the CMM on an air bag apparatus or large concrete platform. These approaches are expensive, space consuming and only isolate external vibrations i.e., ground vibrations. Internal vibrations e.g., caused by electro mechanical servo mechanisms mounted on the machine, would not be isolated or dampened.

One approach to minimizing the effect of relative movement between the bridge uprights is discussed in the U.S. Pat. No. 3,749,501 patent where a position indicator is located on each upright. However, this increases the cost for the positional and measurement apparatus of the CMM and still does not address the problem of an undesirable low resonant frequency that can be present in a bridge structure e.g. a resonant frequency below 20 Hertz can adversely effect the measuring accuracy of a CMM.

Accordingly, the accuracy of the measurements made by a bridge type coordinate measuring machine may be adversely affected by poor rigidity and vibrations because of a low resonant frequency of the bridge. This is especially true of a bridge type CMM used for measuring large workpieces, such as an automobile body or engine, because of the height and spacing of the uprights of such a bridge e.g., about one to two meters high with one and a half to two and a half meter spacing.

DISCLOSURE OF THE INVENTION

The invention is a bridge type coordinate measuring machine that has a closed loop bridge configuration that encircles the upper surface of a measuring machine base upon which a workpiece is placed for measurement and is characterized by the location of the bearings for the bridge being offset from the vertical axes of the uprights of the bridge and by a guideway for the bearings located on each side of the base.

*The invention also is a bridge type coordinate measuring machine characterized by a closed loop bridge configuration that encircles the upper surface of the base, and a plurality of bearings positioned to transmit force between the bridge and the base at least vertically and horizontally.*

*According to another aspect of the invention, a bridge type coordinate measuring machine is provided, characterized by means for movably mounting the bridge to the base which includes at least a first pair of laterally spaced bearings, and a closed loop configuration which encircles the upper surface of the base and the first pair of bearings, wherein the closed loop configuration is formed by a second member connecting together the uprights of the bridge below the upper surface of the base.*

*According to another aspect of the invention, a bridge type coordinate measuring machine is provided, characterized by a closed loop bridge configuration encircling the upper surface of the base, and means for movably mounting the bridge to the base which includes first, second and third pairs of bearings positioned to transmit force between the bridge and the base, wherein the first pair of bearings operate in a vertical direction, the second pair of bearings operate in a horizontal direction and in opposition to each other, and the third pair of bearings operate in vertical directions respectively opposite those of the first pair of bearings.*

*A further aspect of the invention resides in a bridge type coordinate measuring machine, characterized by a closed loop bridge configuration which encircles the upper surface of the base in which the closed loop configuration is formed by means for connecting together the uprights of the bridge below the upper surface of the base, and means for movably mounting the bridge to the base which includes first and second pairs of bearings, wherein the first pair of bearings has a first bearing coacting with the base, and one of the uprights and a second bearing coacting with the base and the other upright, and wherein the second pair of bearings is located between the uprights below at least a portion of the means for connecting together the uprights and operating in a horizontal direction.*

*A still further aspect of the invention resides in a bridge type coordinate measuring machine, characterized by a closed loop bridge configuration that encircles the upper surface of the base, and means for movably mounting the bridge to the base which includes a first pair of bearings applying forces in opposite directions to each other in a vertical plane, a second pair of bearings applying forces in opposite directions to each other in a horizontal plane, and a third pair of bearings applying forces in opposite direction to each other in a vertical plane spaced from the vertical plane of the first pair of bearings, and wherein all of the bearings are positioned to transmit forces between the bridge and the base.*

*The invention also consists of a bridge type coordinate measuring machine, characterized by a closed loop bridge configuration encircling the upper surface of the base and at least a portion of means for movably mounting the bridge to the base, wherein the closed loop configuration is formed by a second member connecting together the uprights of the bridge.*

*A further aspect of the invention resides in a bridge type coordinate measuring machine, characterized by a closed*

*loop bridge configuration defined by a first loop encircling the upper surface of the base, and a second loop below the first loop.*

*According to another aspect of the invention, a bridge type coordinate measuring machine is provided, characterized by a closed loop bridge configuration encircling the upper surface of the base, wherein the closed loop configuration is formed by a second member connecting together the uprights of the bridge at the lower ends of the uprights.*

*According to a still further aspect of the present invention, a bridge type coordinate measuring machine is characterized by a bridge having a closed loop configuration encircling the upper surface of the base in which the closed loop configuration is formed by a second member connecting together the uprights at a position below the upper surface of the base, and the bridge is mounted on the base by means of a pair of laterally spaced bearing means, each of the bearing means acting in at least vertical and horizontal directions, the pair of bearing means being arranged such that the forces transmitted by the pair of bearing means are symmetrically balanced with respect to the center of the bridge.*

One advantage of this invention is that it improves the measuring accuracy of a CMM used for measuring large workpieces such as an automobile engine or body.

Another advantage of this invention is that it improves the ridigity of the bridge of a CMM.

Another advantage of this invention is that it lowers the effect of vibrations on the probe mounted on the bridge of a CMM by increasing the resonant frequency of the bridge.

Another advantage of this invention is that it minimizes the need for an expensive system to isolate the measuring probe of a CMM from external vibrations.

DETAILED DESCRIPTION OF THE INVENTION

FIGS. 1 and 2 are perspective views of a bridge type coordinate measuring machine incorporating the principles of this invention.

FIG. 3 is a cutaway view of a CMM showing one arrangement of the bridge mounted to the base of a CMM.

FIG. 4 is still another arrangement of a bridge mounted to the base of a CMM.

Figure 1:
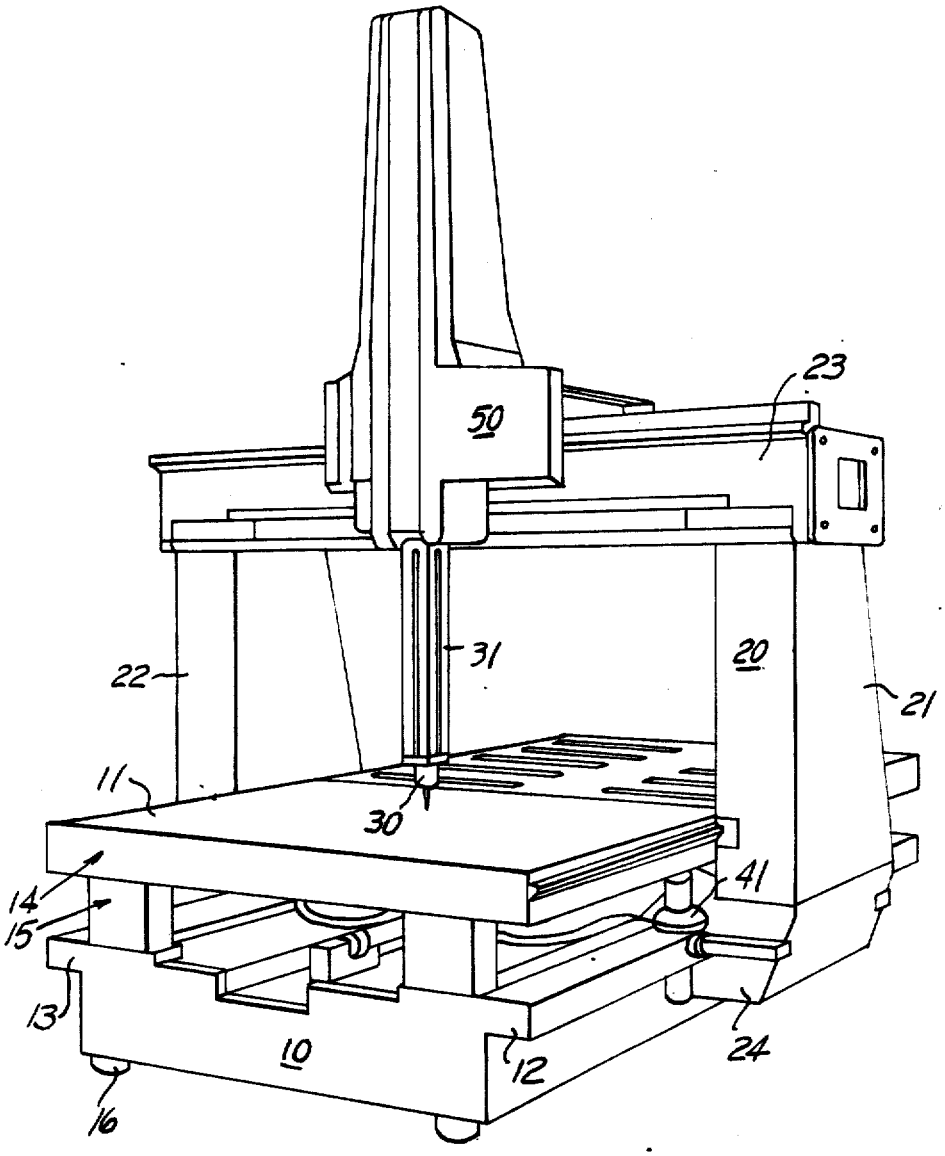

Referring now to the drawings, FIG. 1 illustrates a bridge type coordinate measuring machine of the type having a base 10, a bridge 20 [moveably] *movably* mounted to the base 10, a carriage 50 [moveably] *movably* mounted to the bridge 20, and a probe 30 [moveably] *movably* mounted to the carriage 50. The base 10 includes an upper surface 11 upon which a workpiece (not shown) to be measured is located and guideways 12, 13. The base 10 is divided into an upper table portion 14 separated from the lower portion by legs 15. Rubber feet 16 at the bottom of the base 10, minimize the affect of external vibrations on the CMM. This arrangement of the guide ways 12, 13, and legs 15 provides space, if desired, for a motor and suitable drive mechanism for moving the bridge 20 to be located at the center of the base 10. The bridge 20 includes two uprights 21, 22 connected together by an upper member 23 and a lower member 24. Moveably mounted on the upper member 23 of the bridge 20 is a carriage 50 which has [moveably] *movably* mounted thereto a probe shaft 31 having a probe 30 at one end thereof. The probe 30 is generally of the type that, upon contact with a piece to be measured, provides a signal to appropriate computation and measuring apparatus. One example of such a probe may be found in U.S. Pat. No. 4,270,275 entitled "Probes" and issued June 6, 1981. The bridge 20 is [moveably] *movably* mounted to the base 10 along guide ways 12, 13, the surfaces of which interface with bearings 41 mounted in respective channels 25 in the bridge 20. Preferably, air bearings 41 are used to facilitate movement of the bridge 20 along the guideways 12, 13 of the base 10. Movement of the bridge, carriage and probe shaft 31 allows the probe to move and take measurements in three dimensions. Electrical or mechanical means responsive to movement of the probe indicate the position of the probe in 3 coordinates and, when required, calculate measurements e.g., The Warner and Swasey Company, Sheffield Measurement Division measurement processor model MP3.

FIG. 2 illustrates how the carriage 50 is [moveably] *movably* mounted to the upper member 23 of the bridge 20 along guideways 26, 27, 28 the surfaces of which interface with bearings 55 in respective channels 51, 52, 53 in the carriage 50. The probe 30 is mounted to the bridge 20 for movement along 2 [axis] *axes* and is moveable along a third axis by movement of the bridge. Mounting arrangements for the probe and carriage are described in further detail in the U.S. Pat. Nos. 3,749,501 and 3,840,993. Mechanical or preferably air bearings 55 are used to facilitate movement of the carriage 50 relative to the bridge 20. Also shown is the arrangement of the upper and lower bearings 41 of the bridge 20 that coact with the surfaces of one of the guide ways 12 of the base 10.

FIG. 3 illustrates further details of how the air bearings 41, located *essentially U-shaped* in channels 25 in the bridge 20, interface with the surfaces of the guide ways 12, 13 of the base 10. *The air bearings 41 include first and second laterally spaced pairs thereof. The first laterally spaced pair of bearings 41 bear vertically upward from the guideways 12, 13 respectively against horizontal surfaces carried by the uprights 21, 22 and which form part of the channels 25. The second laterally spaced pair of the bearings 41 bear vertically downward against the lower member 24, such that the first and second pairs of bearings act in opposite vertical directions. Further, the air bearings 41 include a third pair thereof which respectively bear horizontally from the guideways 12, 13 against the uprights 21, 22 and in opposite horizontal directions, perpendicular to the vertical direction in which the first and second pairs of air bearings act. As a result of the bearing arrangement described above, the forces transmitted by the bearings 41 on each side of the bridge 20 are symmetrically balanced with respect to the center of the bridge 20. Preferably, the lower member 24 of the bridge 20 is located above the bearings 41 and below the table portion 14 of the base 10. The upper table portion 14 of the base 10 is supported by only three legs 15. This provides better vibrational and deflectional isolation than would four legs i.e., one in each corner of the table 14.*

FIG. 4 illustrates an alternate embodiment of the invention wherein the bridge 20 has two lower connecting members 24, 29 with the bearings 41 coacting with the guide ways 12, 13 of the base 10 located between the 2 lower members 24, 29 of the bridge 20.

I claim:

1. A bridge type coordinate measuring machine of the type having a base (10) having an upper surface (11) for supporting a work piece to be measured, a bridge (20) having two uprights (21, 22) and a first member (23)

connecting the uprights (21, 22) together above the upper surface (11) of said base (10), means (12, 13, 41) for [moveably] *movably* mounting the bridge (20) to the base (10), a probe (30), and means (50, 31) for mounting said probe (30) to the first member (23) of said bridge (20) for movement relative to said bridge and to said base (10), characterized in that:

the bridge (20) has a closed configuration that encircles the upper surface (11) of said base (10) said closed loop configuration formed by a second member (24) connecting together the uprights (21, 22) of the bridge (20) below the upper surface (11) of said base (10) and below the means (12, 13) for [moveably] *movably* mounting the bridge (20) to the base (10).

2. A bridge type coordinate measuring machine of the type having a base (10) having an upper surface (11) for supporting a work piece to be measured, a bridge (20) having two uprights (21, 22) and a first member (23) connecting the uprights (21, 22) together above the upper surface (11) of said base (10), means (12, 13, 41) for [moveably] *movably* mounting the bridge (20) to the base (10), a probe (30), and means (50, 31) for mounting said probe (30) to the first member (23) of said bridge (20) for movement relative to said bridge and to said base (10), characterized in that:

the bridge (20) has a closed loop configuration that encircles the upper surface (11) of said base (10) said closed loop configuration formed by a second member (24) connecting together the uprights (21, 22) of the bridge (20) below the upper surface (11) of said base (10); and by the means for [moveably] *movably* mounting the bridge (20) to the base (10) includes a pair of guideways (12, 13), one of said guideways (12) located on one side of said base (10) and the other of said guideways (13) located on the opposite side of said base (10), said guideways (12, 13) coacting with bearings (41) in a respective channel (25) in each of said uprights (21, 22) of said bridge (20) to facilitate movement of said bridge (20) on said base, said second member (24) connecting the uprights (21, 22) of the bridge (20) together located below said guideways (12, 13).

3. A bridge type coordinate measuring machine of the type having a base (10) having an upper surface (11) for supporting a work piece to be measured, a bridge (20) having two uprights (21, 22) and a first member (23) connecting the uprights (21, 22) together above the upper surface (11) of said base (10), means (12, 13, 41) for [moveably] *movably* mounting the bridge (20) to the base (10), a probe (30), and means (50, 31) for mounting said probe (30) to the first member (23) of said bride (20) for movement relative to said bridge and to said base (10), characterized in that:

the bridge (20) has a closed loop configuration that encircles the upper surface (11) of said base (10) said closed loop configuration formed by a second member (24) connecting together the uprights (21, 22) of the bridge (20) below the upper surface (11) of said base (10); and by guideways (12, 13) along which said bridge (20) is [moveable] *movable* and a third member (29) connecting the uprights (21, 22) of the bridge (20) together below the surface (11) of said base (10) and above said guideways (12, 13), said second member (24) connecting together the uprights (21, 22) of the bridge (20) located below said guideways (12, 13).

4. A bridge type coordinate measuring machine as described in claim 3 wherein the height of each of the two uprights (21, 22) is greater than one meter.

5. A bridge type coordinate measuring machine of the type having a base (10) having an upper surface (11) for supporting a work piece to be measured, a bridge (20) having a closed loop configuration that encircles the upper surface (11) of said base (10) said closed loop configuration formed by two uprights (21, 22), a first member (23) connecting the uprights (21, 22) together above the upper surface (11) of said base (10), and a second member (24) connecting together the uprights (21, 22) of the bridge (20) below the upper surface (11) of said base (10), means (12, 13, 41) for [moveably] *movably* mounting the bridge (20) to the base (10), a probe (30), and means (50, 31) for mounting said probe (30) to the first member (23) of said bridge (20) for movement relative to said bridge and to said base (10), the means for [moveably] *movably* mounting the bridge (20) to the base (10) characterized by:

a pair of guideways (12, 13), located below the upper surface (11) of the base (10), one of said guideways (12) located on one side of said base (10) and the other of said guideways (13) located on the opposite side of said base (10), each of said guideways (12, 13) coacting with respective bearings (41) located in a respective channel (25) formed between said second member (24), and an inwardly extending portion of each of said uprights (21, 22).

6. A coordinate measuring machine as described in claim 5 wherein said bearings (41) include bearings that coact against upwardly and downwardly facing surfaces of a respective guideway (12, 13).

7. A coordinate measuring machine as described in claim 6 wherein said bearings (41) include bearings that coact against a side of each of the guideways (12, 13).

8. A coordinate measuring machine as described in claim 6 including a third member (29) connecting the uprights (21, 22) of the bridge (20) together below the surface (11) of said base (10) and above said guideways (12, 13).

9. A bridge type coordinate measuring machine as described in claim 5, wherein the bearings (41) are located between the vertical axes of the uprights (21, 22).

10. A bridge type coordinate measuring machine as described in claim 6 wherein the bearings (41) are located between the vertical axes of the uprights (21, 22).

11. A bridge type coordinate measuring machine as described in claim 7 wherein the bearings (41) are located between the vertical axes of the uprights (21, 22).

12. A bridge type coordinate measuring machine as described in claim 6 wherein the bearings (41) coacting upwardly and downwardly are located beneath the upper surface (11) of the base (10).

13. A bridge type coordinate measuring machine as described in claim 7 wherein the bearings (41) coacting upwardly and downwardly are located beneath the upper surface (11) of the base (10).

14. A bridge type coordinate measuring machine as described in claim 8 wherein the bearings (41) coacting upwardly and downwardly are located beneath the upper surface (11) of the base (10).

15. A bridge type coordinate measuring machine as described in claim 10 wherein the bearings (41) coacting upwardly and downwardly are located beneath the upper surface (11) of the base (10).

16. A bridge type coordinate measuring machine as described in claim 11 wherein the bearings (41) coacting upwardly and downwardly are located beneath the upper surface (11) of the base (10).

17. A bridge type coordinate measuring machine as described in claim 5 wherein the second member (24) is located below the bearings.

18. A bridge type coordinate measuring machine as described in claim 17 including a third member (29) connecting the uprights (21, 22) of the bridge together below the surface (11) of the base (10) and above the guideways (12, 13).

19. A bridge type coordinate measuring machine of the type having a base (10) having an upper surface (11) for supporting a work piece to be measured, a bridge (20) having a closed loop configuration that encircles the upper surface (11) of said base (10) said closed loop configuration formed by two uprights (21, 22), a first member (23) connecting the uprights (21, 22) together above the upper surface (11) of said base (10), and a second member (24) connecting together the uprights (21, 22) of the bridge (20) below the upper surface (11) of said base (10), means (12, 13, 41) for [moveably] *movably* mounting the bridge (20) to the base (10), a probe (30), and means (50, 31) for mounting said probe (30) to the first member (23) of said bridge (20) for movement relative to said bridge and to said base (10), the means for [moveably] *movably* mounting the bridge (20) to the base (10) characterized by:

a pair of guideways (12, 13), each of said guideways (12, 13) coacting with a respective plurality of bearings (41), said guideways and bearings located directly below the upper surface (11) of the base (10), one of said guideways (12) and its respective bearings (41) located at one side of said base (10) and the other of said guideways (13) and its respective bearings (41) located at the opposite side of said base (10).

20. A coordinate measuring machine as described in claim 19 wherein said bearings (41) coact against upwardly and downwardly facing surfaces of a respective guideway (12, 13).

21. A coordinate measuring machine as described in claim 20 wherein said bearings (41) also coact against a side of each of the guideways (12, 13).

22. A coordinate measuring machine as described in claim 19 wherein said bearings (41) are located between the vertical axes of the uprights (21, 22).

*23. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface (11) of said base (10), means (12, 13, 41) for movably mounting said bridge (2) to said base (10), a probe (30), and means (50, 31) for mounting said probe (30) to a first member (23) of said bridge (20) for movement relative to said bridge and to said base (10), characterized in that:*

*the bridge (20) has a closed loop configuration that encircles the upper surface (11) of said base (10), said closed loop configuration being formed by a second member (24) connecting together the uprights (21, 22) of the bridge (20) below the upper surface (11) of said base (10) and below the means (12, 13) for movably mounting the bridge (20) to the base (10),* and

*the means (12, 13, 14) for movably mounting the bridge to the base (10) includes a plurality of bearings (41) positioned to transmit force between said bridge (2) and said base (10) at least vertically and horizontally.*

*24. A coordinate measuring machine as described in claim 23, wherein said bearings (41) include air bearings.*

*25. A coordinate measuring machine as described in claim 23, wherein said bearings (41) include at least a first pair of laterally spaced bearings respectively acting in a vertical direction against a pair of surfaces of said bridge (20).*

*26. A coordinate measuring machine as described in claim 25, wherein said pair of surfaces of said bridge (20) against which said spaced bearings respectively act are respectively defined within a pair of channels (25) in said bridge (20).*

*27. A coordinate measuring machine as described in claim 26, wherein each of said channels (25) is essentially U-shaped.*

*28. A coordinate measuring machine as described in claim 27, wherein said channels open inwardly toward each other.*

*29. A coordinate measuring machine as described in claim 26, wherein a portion of each of said channels (25) is defined by said second member (24).*

*30. A coordinate measuring machine as described in claim 28, wherein a portion of each of said channels (25) is defined by said second member (24).*

*31. A coordinate measuring machine as described in claim 25, wherein said first pair of bearings are air bearings.*

*32. A coordinate measuring machine as described in claim 26, wherein said pair of bearings and said surfaces are disposed within said closed loop so as to be surrounded by said bridge (20).*

*33. A coordinate measuring machine as described in claim 32, wherein said pair of bearings are air bearings.*

*34. A coordinate measuring machine as described in claim 25, wherein said pair of bearings is wholly disposed above said second member (24).*

*35. A coordinate measuring machine as described in claim 23, wherein:*

*said bearings (41) includes at least a first pair of laterally spaced bearings respectively acting in a vertical direction against a pair of surfaces of said bridge (20),*

*said pair of bearings and said surfaces are disposed within said closed loop so as to be surrounded by said bridge (20), and*

*the entirety of said second member (24) is spaced below said pair of bearings.*

*36. A coordinate measuring machine as described in claim 35, wherein said bridge (20) includes a pair of laterally spaced channels (25) opening toward each other, and said pair of surfaces are respectively defined within said channels (25).*

*37. A coordinate measuring machine as described in claim 36, wherein said pair of surfaces extend parallel to said second member (24).*

*38. A coordinate measuring machine as described in claim 25, wherein said bearings (41) include a second pair of laterally spaced bearings respectively acting in a vertical direction against a pair of surfaces carried by said base (10), said first and second pairs of bearings acting to transmit force in opposite directions respectively upwardly and downwardly.*

*39. A coordinate measuring machine as described in claim 38, wherein said bearings (41) include a third pair of laterally spaced bearings acting in a horizontal direction.*

*40. A coordinate measuring machine as described in claim 23, wherein said bearings (41) include first and*

*second sets of bearings respectively acting in two directions perpendicular to each other.*

*41. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface (11) of said base (10), means (12, 13, 41) for movably mounting said bridge (20) to said base (10), a probe (30), and means for mounting said probe (30) on said bridge (20) for movement relative to said bridge and to said base (10), characterized in that:*

*said means (12, 13, 41) for movably mounting said bridge to said base (10) includes at least a first pair of laterally spaced bearings (41); and*

*said bridge has a closed loop configuration that encircles the upper surface (11) of said base (10) and said first pair of bearings, said closed loop configuration being formed by a second member (24) connecting together said uprights (21, 22) of the bridge (20) below the upper surface (11) of said base (10).*

*42. A coordinate measuring machine as described in claim 41, wherein said first pair of bearings transmit force vertically.*

*43. A coordinate measuring machine as described in claim 42, wherein each of said uprights (21, 22) carries a horizontal surface disposed within said closed loop, and said pair of bearings respectively bear against said horizontal surfaces of said uprights (21, 22).*

*44. A coordinate measuring machine as described in claim 43, wherein each of said bearings is an air bearing.*

*45. A coordinate measuring machine as described in claim 41, wherein said bridge (20) includes a pair of channels (25) therein, said channels (25) opening toward each other within said closed loop, and said pair of bearings are respectively disposed within said channels (25).*

*46. A coordinate measuring machine as described in claim 45, wherein each of said channels (25) includes a horizontal surface against which a corresponding one of said bearings bears.*

*47. A coordinate measuring machine as described in claim 41, wherein:*

*a bridge (2) includes first and second vertically spaced pairs of horizontal surfaces,*

*said means (12, 13, 41) for movably mounting said bridge (20) to said base (10) includes a second pair of bearings,*

*said first pair of bearings respectively bear upwardly against said first pair of horizontal surfaces, and*

*said second pair of bearings respectively bear downwardly against said second pair of horizontal surfaces.*

*48. A coordinate measuring machine as described in claim 47, wherein said closed loop configuration encircles said second pair of bearings.*

*49. A coordinate measuring machine as described in claim 47, wherein said means (12, 13, 41) for movably mounting said bridge (20) to said base (10) includes a third pair of bearings acting in opposite horizontal directions, and said third pair of bearings is vertically spaced below said first pair of bearings.*

*50. A coordinate measuring machine as described in claim 49, wherein said third pair of bearings is vertically positioned between said first and second pair of bearings.*

*51. A coordinate measuring machine as described in claim 47, wherein the bearings in said first pair thereof are respectively spaced inwardly toward each other from the corresponding axes of said uprights (21, 22).*

*52. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface (11) of said base (10), means (12, 13, 41) for movably mounting said bridge (20) to said base (10), a probe (30), and means (50, 31) for mounting said probe (30) to a first member (23) of said bridge (20) for movement relative to said bridge and to said base (10), characterized in that:*

*the bridge (20) has a closed loop configuration that encircles the upper (11) of said base (10), said closed loop configuration being formed by a second member (24) connecting together the uprights (21, 22) of the bridge (20) below the upper surface (11) of said base (10) and below the means (12, 13) for movably mounting the bridge (20) to the base (10); and*

*the means (12, 13, 41) for movably mounting the bridge the base (10) includes a first, second and third pairs of bearings positioned to transmit force between said bridge (20) and said base (10), said first pair operating in a vertical direction, said second pair operating in a horizontal direction, said bearings in said second pair operating in opposing directions, and said third pair of bearings operating in a vertical direction opposite the direction of a respective bearing of said first pair of bearings.*

*53. A coordinate measuring machine as described in claim 52, wherein said first, second and third pairs of bearings are air bearings.*

*54. A coordinate measuring machine as described in claim 52, wherein said bearings are air bearings.*

*55. A coordinate measuring machine as described in claim 52, wherein said closed loop configuration encircles said first pair of bearings.*

*56. A coordinate measuring machine as described in claim 54, wherein said closed loop configuration encircles said first pair of bearings.*

*57. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface (11) of said base (10), means (12, 13, 41) for movably mounting said bridge (20) to said base (10), a probe (30), and means (50, 31) for mounting said probe (30) to a first member (23) of said workpiece (20) for movement relative to said workpiece and to said base (10), characterized in that:*

*the bridge (20) has a closed loop configuration that encircles the upper surface (11) of said base (10), said closed loop configuration being formed by means (29) for connecting together the uprights (21, 22) of the bridge (20) below the upper surface (11) of said base (10), said uprights (21, 22) respectively carrying horizontal surfaces; and*

*the means (12, 13, 41) for movably mounting the bridge to the base (10) includes a first and second pair of bearings, said first pair having a first bearing vertically coacting with the base and the horizontal surface of one upright (21) and a second bearing vertically coacting with the base and the horizontal surface of the other upright (22), said second pair of bearings located between the uprights below at least a portion of the means (29) for connecting together the uprights (21, 22) and operating in a horizontal direction.*

58. A coordinate measuring machine as described in laim 57, wherein said first and second pairs of bearings re air bearings.

59. A coordinate measuring machine as described in laim 57, wherein said first and second pairs of bearings re air bearings.

60. A coordinate measuring machine as described in laim 57, wherein said connecting means includes at least first connecting member (24), and said closed loop con- iguration encircles said first pair of bearings.

61. A coordinate measuring machine as described in laim 60, wherein said connecting means includes a second onnecting member (29) vertically spaced from said first onnecting member (24), and wherein said second pair of earings is positioned between said first connecting mem- er (24) and said second connecting member (29).

62. A coordinate measuring machine as described in laim 60, wherein said first and second pairs of bearings re air bearings.

63. A bridge type coordinate measuring machine accord- ıg to claim 57 including a third pair of bearings coacting ith the base and the bridge (20), said third pair of bear- ıgs operating in a direction perpendicular to the direction f operation of said second pair of bearings and in a direc- on opposite said first pair of bearings.

64. A coordinate measuring machine as described in laim 61, wherein said first and second pairs of bearings re air bearings.

65. A coordinate measuring machine as described in laim 63, wherein said third pair of bearings are air bear- ıgs.

66. A coordinate measuring machine as described in laim 60, including a third pair of bearings coacting with ıe base and the bridge (20), said third pair of bearings perating in a direction perpendicular to the direction of peration of said second pair of bearings and in a direction pposite said first pair of bearings.

67. In combination, a bridge type coordinate measuring ıachine of the type having a base (10) having an upper ırface (11) for supporting a workpiece to be measured, a ridge (20) having two uprights (21, 22) and a first member 23) connecting said uprights (21, 22) together above the pper surface (11) of said base (10), means (12, 13, 41) for ıovably mounting said bridge (20) to said base (10), a robe (30), and means (50, 31) for mounting said probe 30) to a first member (23) of said workpiece (20) for move- ıent relative to said bridge and to said base (10), charac- rized in that:

the bridge (20) has a closed loop configuration that encircles the upper surface (11) of said base (10), said closed loop configuration being formed by a second member (24) connecting together the uprights (21, 22) of the bridge (20) below the upper surface (11) of said base (10) and below the means (12, 13) for movably mounting the bridge (20) to the base (10); and the means (12, 13, 41) for movably mounting the bridge (20) to the base (10) includes a first pair of bearings applying forces in opposite directions to each other in a vertical plane, a second pair of bearings applying forces in opposite directions to each other in a horizontal plane, a third pair of bearings applying forces in opposite directions to each other in a vertical plane spaced from the vertical plane of said first pair of bearings, all of said bearings positioned to transmit forces between said bridge (20) and said base (10).

68. A coordinate measuring machine as described in laim 67, wherein said first, second and third pair of bear- ıgs are air bearings.

69. A coordinate measuring machine as described in claim 67, wherein all of said first, second and third bearings are air bearings.

70. A coordinate measuring machine as described in claim 67, wherein said closed loop configuration encircles said first pair of bearings.

71. A coordinate measuring machine as described in claim 68, wherein said closed loop configuration encircles said first pair of bearings, and said first pair of bearings are air bearings.

72. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface of said base (10), means (12, 13, 41) for movably mounting said bridge (20) to said base (10), a probe (30), and means (50, 31) for mounting said probe (30) to said first member (23) of said bridge (20) for movement relative to said bridge (20) and to said base (10), characterized in that:

the bridge (20) has a closed loop configuration encircling the upper surface (11) of said base (10) and at least a portion of the means (12, 13, 41) for movably mounting said bridge (20) to said base (10), said closed loop configuration being formed by a second member (24) connecting together the uprights (21, 22) of the bridge (20).

73. A bridge type coordinate measuring machine as described in claim 72, wherein said mounting means (12, 13, 41) includes first and second bearings each transmitting force in a vertical direction and second end and third bearings each transmitting force in a horizontal direction.

74. A bridge type coordinate measuring machine as described in claim 73, wherein said portion of said mounting means (12, 13, 41) includes said first and second bearings.

75. A bridge type coordinate measuring machine as described in claim 74, wherein said first and second bearings are laterally spaced apart.

76. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface of said base (10), means (12, 13, 41) for movably mounting said bridge (20 ) to said base (10), a probe (30), and means (50, 31) for mounting said probe (30) to said first member (23) of said bridge (20) for movement relative to said bridge (20) and to said base (10), characterized in that:

the bridge (20) has a closed loop configuration defined by a first loop encircling the upper surface (11) of said base (10) and a second loop below said first loop.

77. A bridge type coordinate measuring machine as described in claim 76, wherein at least a portion of said mounting means is encircled by said second loop.

78. A bridge type coordinate measuring machine as described in claim 77, wherein said portion of said mounting means includes first and second bearings transmitting force in a horizontal direction.

79. A bridge type coordinate measuring machine as described in claim 78, wherein said first and second bearings are respectively inboard of said uprights (21, 22).

80. A bridge type coordinate measuring machine as described in claim 76, wherein said first loop is formed by a second member (29) connecting together said uprights

*(21, 22) of the bridge (20) below the upper surface (11) of said base (10).*

*81. A bridge type coordinate measuring machine as described in claim 80, wherein said second loop is formed by said second member (29) and a third member (24) below said second member (29).*

*82. A bridge type coordinate measuring machine as described in claim 81, wherein said mounting means (12, 13, 41) includes first and second bearings disposed between said first and second members (29, 24) and each transmitting force in a horizontal direction.*

*83. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface of said base (10), means (12, 13, 41) for movably mounting said bridge (20) to said base (10), a probe (30), and means (50, 31) for mounting said probe (30) to said first member (23) of said bridge (20) for movement relative to said bridge (20) and to said base (10), characterized in that:*

*the bridge (20) has a closed loop configuration encircling the upper surface (11) of said base (10), said closed loop configuration being formed by a second member (24) connecting together the uprights (21, 22) of the bridge (20) at the lower ends of said uprights (21, 22).*

*84. A bridge type coordinate measuring machine as described in claim 83, wherein at least a portion of said mounting means (12, 13, 41) includes bearings (41) disposed inboard of said uprights (21, 22).*

*85. In combination, a bridge type coordinate measuring machine of the type having a base (10) having an upper surface (11) for supporting a workpiece to be measured, a bridge (20) having two uprights (21, 22) and a first member (23) connecting said uprights (21, 22) together above the upper surface of said base (10), means (12, 13, 41) for movably mounting said bridge (20) to said base (10), a probe (30), and means (50, 31) for mounting said probe (30) to said first member (23) of said bridge (20) for movement relative to said bridge (20) and to said base (10), characterized in that:*

*the bridge (20) has a closed loop configuration encircling the upper surface (11) of said base (10), said closed loop configuration being formed by a second member (24) connecting together the uprights (21, 22) at a position below the upper surface (11) of said base (10), and*

*the mounting means (12, 13, 41) includes a pair of laterally spaced bearing means, each of the bearing means acting in at least vertical and horizontal directions, said pair of bearing means being arranged such that the forces transmitted by said pair of bearing means are symmetrically balanced with respect to the center of the bridge (20).*

*86. A bridge type coordinate measuring machine as described in claim 85, wherein each of said bearing means includes a bearing acting vertically upward, and a bearing acting horizontally.*

*87. A bridge type coordinate measuring machine as described in claim 86, wherein said horizontally acting bearing acts outwardly.*

*88. A bridge type coordinate measuring machine as described in claim 86, wherein each of said bearing means includes a bearing acting vertically downward.*

*89. A bridge type coordinate measuring machine as described in claim 88, wherein said horizontally acting bearing acts outwardly.*

* * * * *